United States Patent [19]
Schulze

[11] 4,233,872
[45] Nov. 18, 1980

[54] HYDRAULIC SHOCK ABSORPTION IN PUNCH OR CUTTING PRESSES

[75] Inventor: Eckehart Schulze, Weissach-Flacht, Fed. Rep. of Germany

[73] Assignee: Firma Hartman & Lämmle GmbH & Co. KG, Rutesheim, Fed. Rep. of Germany

[21] Appl. No.: 953,384

[22] Filed: Oct. 23, 1978

[30] Foreign Application Priority Data

Oct. 27, 1977 [DE] Fed. Rep. of Germany ....... 2748145

[51] Int. Cl.³ .............................................. B30B 15/00
[52] U.S. Cl. ...................................... 83/617; 267/119
[58] Field of Search .................. 83/617, 615; 267/119, 267/118, 124, 130, 137

[56] References Cited

U.S. PATENT DOCUMENTS

| 1,849,691 | 3/1932 | Rode | 267/119 |
| 3,124,343 | 3/1964 | Williamson | 267/119 |
| 3,487,736 | 1/1970 | Kaiser et al. | 83/617 X |

FOREIGN PATENT DOCUMENTS 2321663 11/1974 Fed. Rep. of Germany ............. 83/617
2355520 5/1975 Fed. Rep. of Germany ............. 83/617

*Primary Examiner*—J. M. Meister
*Attorney, Agent, or Firm*—Edwin E. Greigg

[57] ABSTRACT

There is provided a hydraulic shock absorption cutting and/or punching system which may be applied to a pre-existing press with said system having at least one damping cylinder that is under preset pressure supplied by a pump with the pressure chamber of the cylinder being connected with a damping valve. The damping valve has a piston-type displacing element including a throttle member, the construction and design of which provides for pressure-dependent adjustment of said throttle member in a housing on axial movement of said throttle member so that the cross section of a throttle gap is finely controlled and pressure-dependent adjustment of said gap is attained while also providing for practically constant flow through said throttle gap.

17 Claims, 6 Drawing Figures

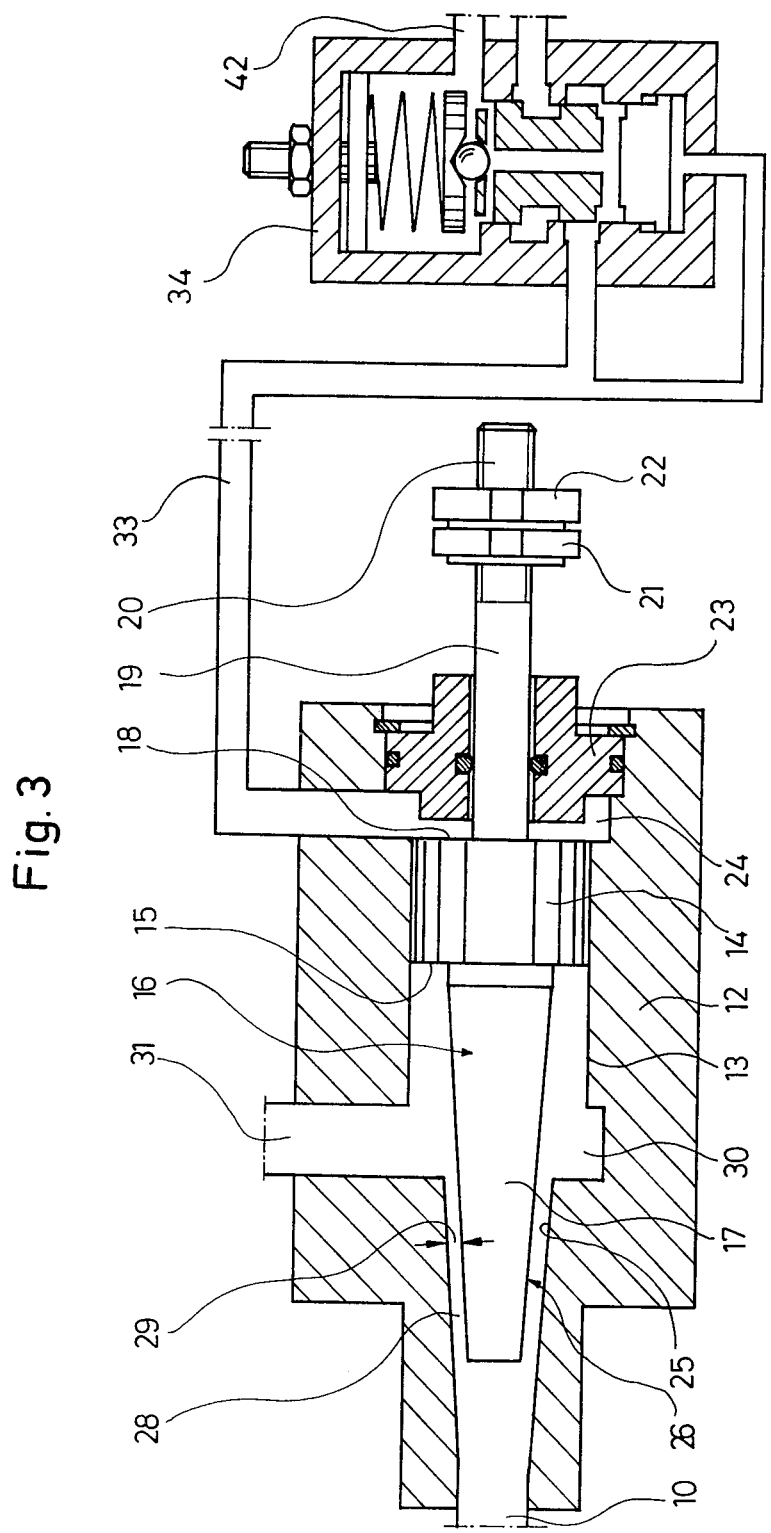

HYDRAULIC SHOCK ABSORPTION IN PUNCH OR CUTTING PRESSES

BACKGROUND OF THE INVENTION

The invention relates to hydraulic shock absorption in punch or cutting presses with at least one damping cylinder which is under preset pressure supplied by a pump with the pressure chamber of the cylinder being connected with a damping valve. When work materials are cut, the pressure of the press builds up to full strength within the first third of the material to be cut. If the material to be cut tears off, then the cutting pressure is suddenly reduced; and in presses without shock absorption, the entire store of energy in the working tools and in the machine frame or stand is liberated virtually without inertia. This results in a very rapid relative movement between the machine base and the ram device and the energy release takes place within a range of milliseconds. Excessively loud noises and increased wear of both press and machine tools thus result.

In order to damp this energy release and flatten the downward curve of the force of the press in order to cushion the accelerated masses, it is known to support the upper portion of the machine against the lower portion by means of hydraulic cylinders. These cylinders have an electronically controlled hydraulic circuit arranged in such a way that when the material to be cut has been entirely cut through, they immmediately take over and slowly drop in pressure over a period of time which is adjustable. A rotary servo valve is provided within the control circuit as the damping valve. The necessity for a complete control circuit including servo valves and subsequent amplifier stages, pressure absorbers, electronic structural parts, switching thresholds and force-actuated diaphragms requires high construction costs and the susceptibility to failure is much greater.

OBJECT AND SUMMARY OF THE INVENTION

The fundamental object of the invention is to create a hydraulic means for absorption which is simple and cost-effectively built, and the elements of which can be easily mounted, if necessary subsequent to installation of the press, with the operation of the press being substantially improved and with less danger of its becoming dirty.

In order to attain this object, the invention provides that the damping valve has a displacing element for the purpose of pressure-dependent adjustment of the throttle gap and that the displacing element is subject to a counter-pressure load which acts in the direction in which the throttle gap is reduced. A particularly simple design then results if the displacing element comprises a piston, onto which a throttle member is attached which, in cooperation with a rigid portion of the housing, forms the throttle gap, and the rigid portion and the throttle member are adjusted wih respect to each other in such a way that when the throttle member is moved axially, the cross section of the throttle gap varies or changes. In accordance with a further feature of the invention, the damping valve is embodied as a laminar throttle, whereby the throttle member preferably comprises a tapered plunger and the rigid portion of the housing a tapered bore, where the plunger and the tapered bore are complementally formed to have the same degree of taper and are fitted into each other and are embodied as slender and long. The cross section or diameter of the throttle gap is maintained constant over a length which is at least 50 times the width of the gap. In this manner, the flow speed of the oil is lowered to such a considerable extent that turbulence cannot rise within the throttle gap proper. Accordingly, by means of the laminarflow effect, the flow through the throttle gap is maintained practically constant. In accordance with the invention, a return flow chamber which is sealed off from a first side of the piston is located to the right of the throttle gap as viewed in the drawings and the other side of the piston defines a control chamber in which the counter-pressure load is generated. In this manner, the force of the press increases when the working tool is first pressed into the material to be cut, but when this tool passes through the material, it does not fall to zero or below and instead the press is delayed in its stroke movement but still pressure is exerted until bottom dead center is reached. This has the result that the damping effect leads to a relatively noiseless operation of the press, and wear and tear of the press and the machine tool elements is greatly reduced. Meanwhile, the solution to these problems afforded by the invention necessitates only small cost. The operation is failure-free, and in particular parts which are endangered by becoming dirty are not required.

Structurally, it is of particular simplicity to have a supply line from the pump discharge into a line which connects the damping cylinder and the damping valve as well as to provide a check valve in the supply line. The return flow chamber of the damping valve communicates via a line with the tank from which the pump draws, and the control chamber of the damping valve is likewise acted upon by the pump, whereby a pressure reduction valve is switched into, or included in, the line between the pump and control chamber.

It is of particular advantage if the throttle gap can be adjusted from the outside. As a rule, the gap is originally selected to be very small, so that the apparatus also is effective when the press is starting up. For this purpose, a rod is attached to the piston on the side remote from the throttle member, and this rod which extends through a bushing supported in the housing has a screw threaded end portion provided with lock nuts.

In particular in mechanical presses, it is customary that all damping cylinders are supplied in common by a pump and a separate damping valve, check valve, and pressure reduction valves are associated with each damping cylinder. In this case, the damping cylinder preferably rests upon the machine frame, while the ram device contacts the upwardly extending end face of a piston rod. In hydraulic presses, it is provided in accordance with the invention that the ram device provides the piston for the damping cylinder. In this case, the ram device has a piston rod which is secured to an annular piston which is guided within the damping cylinder. In one embodiment disclosed herein rod means which extend from the annular piston are arranged to abut upstanding members which are locally rigid but adjustable in their height. In this type of structure it is sufficient to provide one damping valve.

The invention will be better understood as well as further objects and advantages thereof become more apparent from the ensuing detailed description of preferred embodiments taken in conjunction with the drawings.

BRIEF DESCRIPTION OF THE DRAWINGS

FIG. 3 shows the same apparatus during a second damping phase;

DESCRIPTION OF THE PREFERRED EMBODIMENTS

Figure 1:
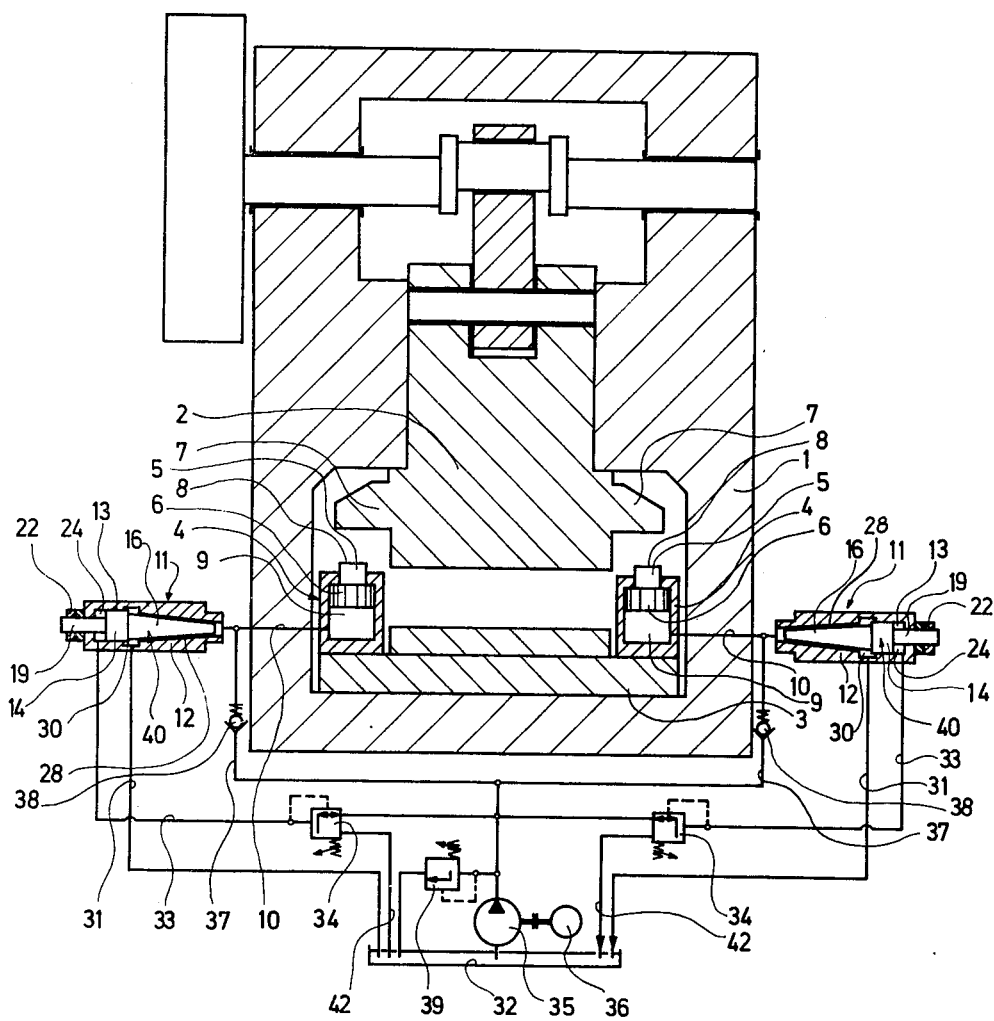
FIG. 1 shows in schematic representation a cross-sectional view through a mechanical press with the hydraulic shock absorption means.

Turning now to FIG. 1, there is shown a mechanical press provided with a ram-type device or means which is guided within a machine frame or stand 1. On a platform 3 supported adjacent to the base of the machine there are provided damping cylinders 4 which are positioned in close proximity to the opposed walls of the housing with each of the cylinders 4 being provided with a piston 6 and a piston rod 5 which projects through the top of the cylinder 4 and is thereby arranged to receive the cantilever arms 7 of the ram 2. Each of the pressure chambers 9—9 of the aforesaid damping cylinders 4 is arranged to communicate via connecting lines 10—10 with damping valves 11—11, the structure of which may be seen quite clearly by referring at this time to FIGS. 2 and 3.

Inasmuch as the valves 11—11 are of substantially identical construction and are arranged to operate in unison the further discussion of FIG. 1, in particular, will be made by referring only to one of the damping valves to further elucidate on its construction and function.

Figure 2:
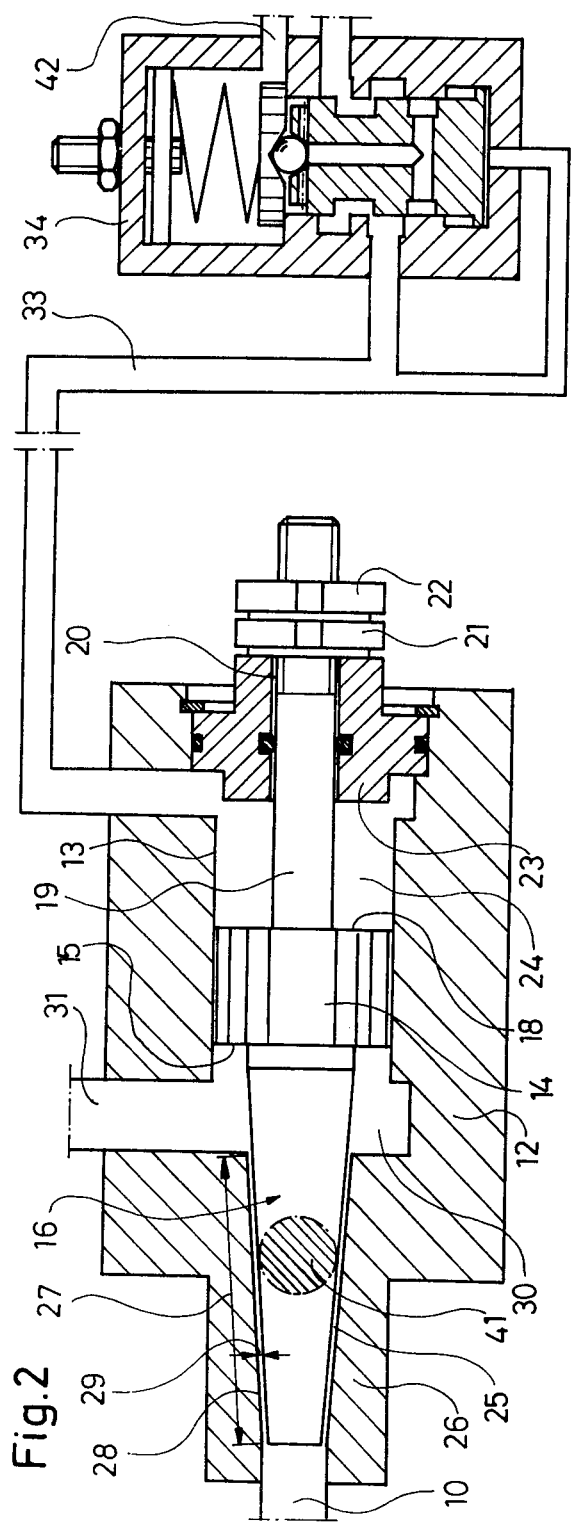
FIG. 2 shows in a larger scale a longitudinal sectional view through a damping valve and a pressure reduction valve in accordance with the invention during a first damping phase.

The housing 12 of the valve 11 is provided with a cylinder within which a control piston 14 is arranged to reciprocate. (See FIGS. 2 and 3). As shown in FIG. 2, a throttle member 16 in the form of an elongated tapered plunger 17 having a circular cross section projects from one end of piston face 15. The control piston 14 is provided on the opposite face 18 thereof with a rod 19 provided with screw threads 20 and on which lock nuts 21,22 are adjustably secured. The rod 19 projects through a bushing 23 and is arranged to be sealed off from a control chamber 24 provided between the inner end wall of the bushing 23 and the piston face 18. The housing 12 is provided with an elongated integral rigid portion 26 having an internal tapered bore 25 which is complemental to the tapered plunger 17. Accordingly, it is to be understood and as is considered to be clear particularly from the view in FIG. 2, the bore 25 corresponds to the shape of the plunger 17 so that over a length indicated by the arrows 27, a throttle gap 28 is produced with a definite constant gap width 29 which is set by means of the position of the throttle member 16 with respect to the extremity 26 provided on the end wall of the housing 12. With further reference to FIG. 2, the length 27 indicated by the arrows is at least 50 times as great as the gap width 29 and thus assures the laminar-flow effect which is sought. The return flow chamber 30 adjacent to piston face 15 communicates via a line 31 with a tank 32 and the control chamber 24 provided on the other piston face 18 is connected to a line 33 which communicates via a pressure reduction valve 34 with a pump 35 which draws its supply from the tank 32. The pump 35 which is driven by a motor 36 is connected via a supply line 37, which includes a check valve 38, with the connection line 10. A pressure control device 39 is preferably adjusted to a supply pressure of 15 bar. The pressure reduction valve 34 is preferably adjusted to 10 bar; thus this pressure appears as the counter-pressure load in the control chamber 24 on the piston face 18. The control piston 14 with its throttle member 16 and the rod 19 in the damping valve 11 is indicated as the displacing element as a whole with reference numeral 40.

Reference is made again at this time to FIG. 1. The pistons 6 in the damping cylinders 4 are under a pressure of approximately 15 bar, as noted earlier herein, via the pump 35 and the check valves 38. When the ram device 2 descends, its cantilever arms 7 come into contact with the upwardly projecting surfaces 8 of the piston rods 5 and the pistons 6 are pressed downwardly into the pressure chambers 9 with the result that the hydraulic medium is urged through the connection lines 10 to the damping valves 11 and the check valves 38 have been caused to close. The consequent lowering of the pistons 6 causes a pressure increase in the pressure chambers 9 which is exerted upon the tapered plunger 17 so that the displacing element 40 is moved against the pressure of approximately 10 bar prevailing in the control chambers 24 in such a manner that the throttle gap 28 can be increased. In this connection see FIG. 3. The pressure surfaces are selected to be such that between the control chamber 24 (on the piston side provided with the face 18) and a central surface 41 (seen in FIG. 2) of the tapered plunger 17, there is a ratio of 3:1. Thus, at a pressure of 30 bar or more in the pressure chamber 9, the displacing element 40 is moved in the direction of the control chamber 24 and the hydraulic medium is discharged from the control chamber 24 via the line 33, the pressure reduction valve 34 and a return line 42 to the tank 32. In dependence on the speed of the ram device 2, a control starts to vary the size of the throttle gap 28 in accordance with pressure. The throttle gap 28, however, always functions as a laminar gap with the effect that the flow therethrough is maintained virtually constant. The tapered plunger 17 with the control piston 14 thus has the effect of a differential regulator.

Figure 6:
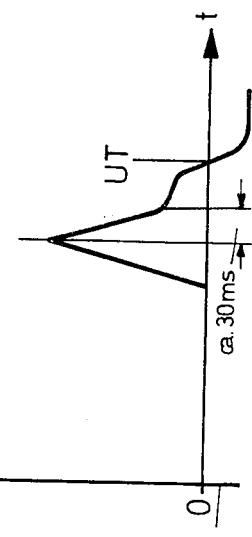
FIG. 6 is a diagrammatic view of the course of the forces exerted by presses of the type disclosed herein.
Figure 5:
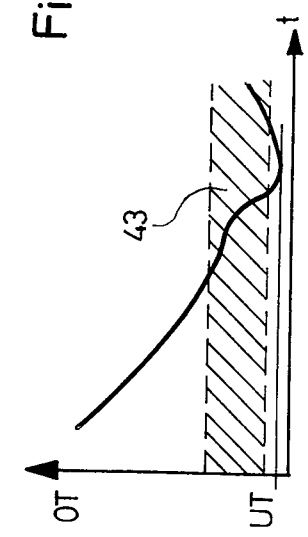
FIG. 5 is a diagrammatic view of the course of the stroke of the working tool over a period of time.

After the pressure increases within the pressure chamber 9 to approximately 30 bar as a result of the descent of the piston 6, the ram device 2 makes contact by means of its working tool with the material to be cut and the cutting process begins. When the material has been cut through entirely the load of the ram means is absorbed by means of the piston 6 so that the force of the press, as may best be appreciated by referring to the diagram of FIG. 6, does not suddenly drop to zero but rather does so after a period of significant delay, with the effect that any cutting shock is practically omitted. The course of the movement of the ram device while traveling through a piece of the material to be cut over a period of time is shown in detail in the diagram of FIG. 5, while the force of the press, that is, the rapid-return force in this time period is shown in FIG. 6. Thus, a gentle descent or travel through the material is achieved by means of the damping operation. The deciding factor is the self-regulation by means of the simple disposition and the particular design of the damping valves 11, whereby the installation of the apparatus requires only limited expense and as a direct result of the simplicity of the structural elements and the path of flow unendangered by becoming dirty, failures do not arise. In the mechanical press in accordance with FIG. 1, it is sufficient to include two simple damping cylinders 4; a separate damping valve 11, a check valve 38 and a pressure reduction valve 34, all of which are associated with each cylinder 4 and the pressure chambers 9 which are both supplied in common by the pump 35. The axial motion of the displacing element 40 and thus the size of the throttle gap 28 is determined dynamically by the motion of the press. The inertia of the pressure reduction valve 34 is chosen in such a way that the behavior in time is adapted to the motion of the rapidly descending motion of the ram device 2.

Figure 4:
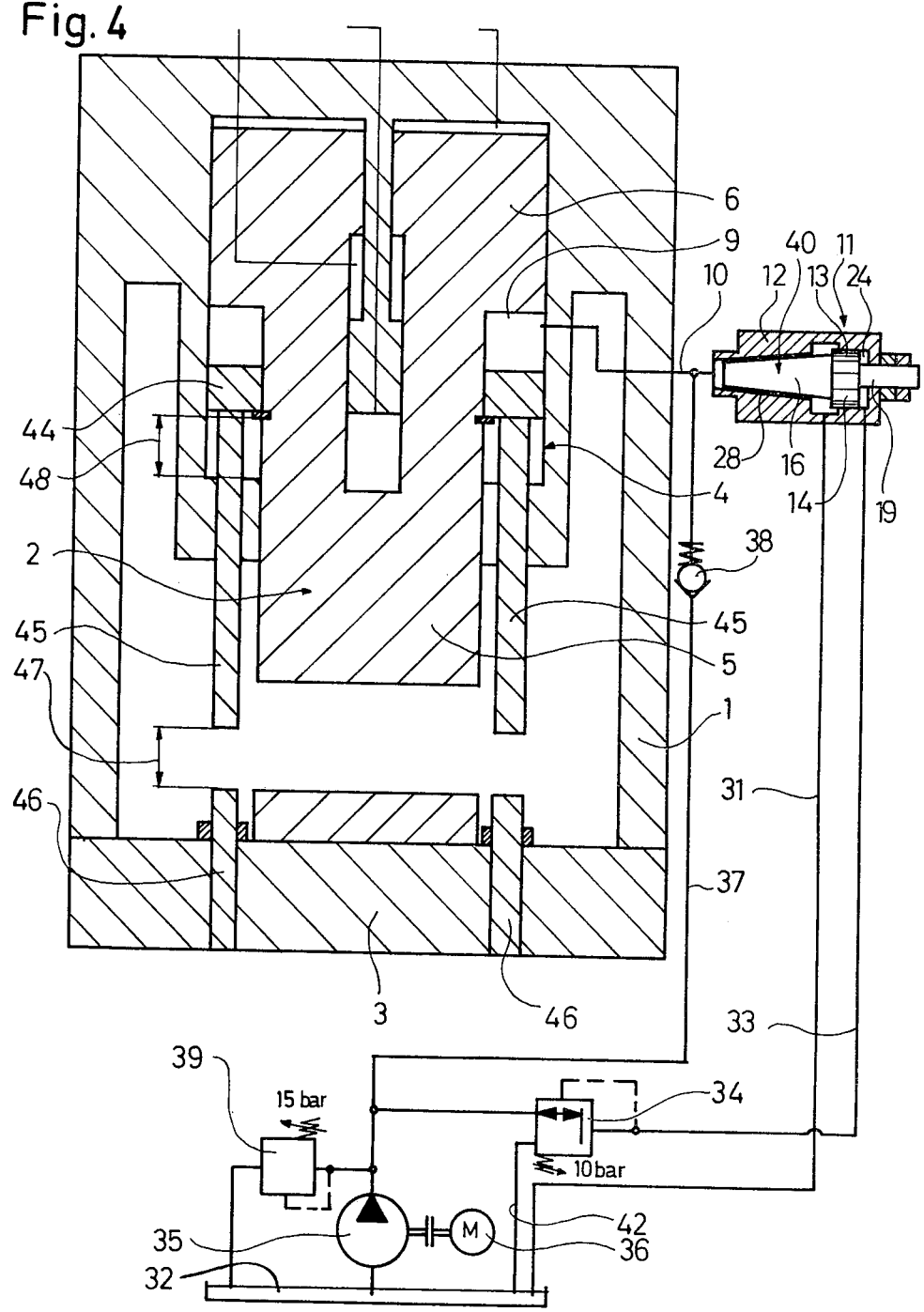
FIG. 4 shows a cross-sectional view of a hydraulic press of a modified design.

In a hydraulic press such as shown in FIG. 4, the damping cylinder 4 may be integrated with the ram device. The pressure chamber 9, in this instance, is defined on one side by the ram means 2, which is embodied here as a piston and on the other side by a separate annular piston 44. Support rods 45 extend from the annular piston 44 and their terminal end portions may abut the support members 46 on the machine platform 3 when the ram means 2 descends. Also in FIG. 4, a rapid-travel region 47 and a maximum press stroke 48 are indicated. A damping valve 11 in this design is attached to the pressure chamber 9 via a connection line 10. The structure and the mode of operation of the damping valve 11 corresponds completely to the description given above in connection with the mechanical press shown in FIG. 1. It is also to be understood that the height of the support members 46 is adjustable.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A hydraulic shock absorption apparatus for cutting or punch mechanical presses provided with at least one damping cylinder having a pressure chamber, pump means for supplying a preset pressure to said pressure chamber, and a damping valve connected to the pressure chamber of said damping cylinder, wherein said damping valve includes:
    a housing;
    a displacing element, which is disposed within said housing and which defines with said housing a throttle gap or opening whose cross-section is determined by said displacing element;
    throttle gap increasing means for subjecting said displacing element to a pressure-dependent load which acts in a direction to increase said throttle gap cross-section; and
    throttle gap decreasing means for subjecting said displacing element to a counter-pressure load which acts in another opposite direction to decrease said throttle gap cross section;
    whereby said throttle gap is adjusted in dependence on pressure.

2. A hydraulic shock absorption apparatus as claimed in claim 1, further wherein said damping valve is embodied as a laminar throttle.

3. A hydraulic shock absorption apparatus as claimed in claim 1, further wherein said damping valve housing defines a bore therein, and said displacing element includes a control piston having a throttle member attached thereto and forming with said bore said throttle gap, said throttle member being axially reciprocable in said housing bore to vary the cross-section of said throttle gap.

4. A hydraulic shock absorption apparatus as claimed in claim 3, further wherein said throttle member comprises a tapered plunger and said housing bore is tapered complementally to said tapered plunger.

5. A hydraulic shock absorption apparatus as claimed in claim 3, further wherein a housing forms said cylinder for said control piston of said damping valve.

6. A hydraulic shock absorption apparatus as claimed in claim 3, further wherein said throttle gap in said bore is maintained constant over a predetermined length which is at least 50 times the width of said throttle gap.

7. A hydraulic shock absorption apparatus as claimed in claim 3, further wherein said displacing element is adjustably mounted in said housing.

8. A hydraulic shock absorption apparatus as claimed in claim 7, further wherein a rod is attached to said control piston on the side remote from said throttle member, said rod being screw threaded and provided with lock nut means.

9. A hydraulic shock absorption apparatus as claimed in claim 1, further wherein a supply line in communication with said pump means discharges into a connection line between said damping cylinder and said damping valve and a check valve is disposed in said supply line.

10. A hydraulic shock abosrption apparatus for punch or cutting presses which includes at least one damping cylinder having a pressure chamber, pump means for supplying a preset pressure to said pressure chamber, and a damping valve connected to said pressure chamber, wherein said damping valve includes a housing defining a bore thereof and a displacing element which is axially reciprocal within said bore and which defines with the housing an adjustable throttle gap or opening whose cross-section is increased as the displacing element is axially displaced in one direction and is decreased as the displacing element is axially displaced in another opposite direction, said apparatus further comprising a throttle gap increasing means for subjecting said displacing element to a pressure-dependent load which acts in said one direction, and a throttle gap decreasing means for subjecting said displacing element to a counter-pressure load which acts in said opposite direction, to thus effect pressure-dependent adjustment of the throttle gap cross-section, wherein said displacing element comprises:
    a control piston having attached thereto a throttle member which defines, with said bore, said throttle gap, wherein said control piston has oppositely disposed faces, one face defining, with said bore, a return flow chamber adjacent to said throttle member and the other face defining, with said bore, a control chamber for said counter-pressure load.

11. A hydraulic shock absorption apparatus as claimed in claim 10, further wherein said return flow chamber communicates with a supply tank.

12. A hydraulic shock absorption apparatus as claimed in claim 11, including a line for communicating said pump means with said control chamber, further wherein said control chamber is fed from said pump means and a pressure reduction valve is disposed in said line between said pump means and said control chamber.

13. A hydraulic shock absorption apparatus as claimed in claim 1, including a plurality of said damping cylinders supplied by said pump means and wherein separate damping valves, check valves and pressure reduction valves are associated with each of said plurality of damping cylinders.

14. A hydraulic shock absorption apparatus as claimed in claim 1, further wherein said apparatus is mounted on a mechanical press having a frame arranged to support said damping cylinder and including a ram device and wherein said damping cylinder includes a piston having a rod and wherein said ram device contacts the off-standing face of said piston rod.

15. A hydraulic shock absorption apparatus as claimed in claim 1, further wherein said ram device opposes said piston disposed in said damping cylinder.

16. A hydraulic shock absorption apparatus for cutting or punch presses provided with at least one damping cylinder having a pressure chamber, pump means for supplying a preset pressure to said pressure chamber of said damping cylinder, further wherein said apparatus includes a frame arranged to support a reciprocable work tool, a chamber, an annular piston in said chamber surrounding said work tool, a damping valve, and means for communicating said damping valve with said cylinder pressure chamber, said damping valve including:
- a housing;
- a displacing element, which is disposed within said housing and which defines with said housing a throttle gap or opening whose cross-section is determined by said displacing element;
- throttle gap increasing means for subjecting said displacing element to a pressure-dependent load which acts in a direction to increase said throttle gap cross-section; and
- throttle gap decreasing means for subjecting said displacing element to a counter-pressure load which acts in another opposite direction to decrease said throttle gap cross-section;
- whereby said throttle gap is adjusted in dependence on pressure.

17. A hydraulic shock absorption apparatus as claimed in claim 16, further wherein said frame includes a base portion and adjustable members arranged to cooperate with rod means associated with said annular piston projecting from said base portion.